United States Patent
Nguyen et al.

(10) Patent No.: US 8,324,869 B2
(45) Date of Patent: Dec. 4, 2012

(54) METHOD AND APPARATUS FOR AVERAGE CURRENT CONTROL

(75) Inventors: Vietson M. Nguyen, Rockford, IL (US); Josh C. Swenson, Rockford, IL (US); Sastry V. Vedula, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 315 days.

(21) Appl. No.: 12/859,928

(22) Filed: Aug. 20, 2010

(65) Prior Publication Data

US 2012/0043944 A1 Feb. 23, 2012

(51) Int. Cl.
*H01M 10/44* (2006.01)
*H01M 10/46* (2006.01)
(52) U.S. Cl. ........................................ 320/166
(58) Field of Classification Search ............. 320/107, 320/128, 140, 163, 166; 323/284, 285, 271
See application file for complete search history.

(56) References Cited

U.S. PATENT DOCUMENTS

| | | | |
|---|---|---|---|
| 5,926,011 A * | 7/1999 | Elliott | 323/266 |
| 6,091,229 A * | 7/2000 | Oglesbee et al. | 320/137 |
| 6,142,418 A | 11/2000 | Weber et al. | |
| 6,182,435 B1 | 2/2001 | Niggemann et al. | |
| 6,316,841 B1 | 11/2001 | Weber | |
| 7,094,496 B2 | 8/2006 | Rodriguez et al. | |
| 7,367,193 B1 | 5/2008 | Thompson | |
| 7,383,903 B2 | 6/2008 | Varenne | |
| 7,555,893 B2 | 7/2009 | Okai et al. | |
| 7,566,981 B2 | 7/2009 | Kunkel et al. | |
| 7,568,958 B2 | 8/2009 | Vigier | |
| 7,634,911 B2 | 12/2009 | Brinkman | |
| 2005/0206358 A1 * | 9/2005 | Van Der Horn et al. | 323/282 |

OTHER PUBLICATIONS

U.S. Appl. No. 12/724,691, filed Mar. 16, 2010, "Control Method for Electrical Accumulator Unit".
U.S. Appl. No. 12/859,353, filed Aug. 19, 2010, "Active Filtering Electrical Accumulator Unit,".
U.S. Appl. No. 12/859,386, filed Aug. 19, 2010, "Modular Electrical Accumulator Unit,".
U.S. Appl. No. 12/859,368, filed Aug. 19, 2010, "Method for Controlling an Electrical Accumulator Unit,".

* cited by examiner

*Primary Examiner* — Edward Tso
(74) *Attorney, Agent, or Firm* — Carlson, Gaskey & Olds PC

(57) ABSTRACT

A method and apparatus for controlling a converter circuit within the electrical accumulator unit based on a comparison between an actual average converter current and a desired average converter current.

18 Claims, 3 Drawing Sheets

METHOD AND APPARATUS FOR AVERAGE CURRENT CONTROL

BACKGROUND OF THE INVENTION

The present application is directed toward a control system for an electrical accumulator unit.

In order to provide power to electrical systems, many vehicles, such as military aircraft, feature an on-board generator that converts rotational movement within the engines to electrical power using known power generation techniques. The generated electrical power is used to power on-board electrical components such as flight controls, sensors, or weapons controls. During standard operations, such a system will have an electrical load that normally draws power at a certain level. If some on-board electrical systems, such as weapons systems, are activated a temporary elevated load spike can occur.

In order to compensate for the temporary load spike, a generator is typically used that is rated at least as high as the highest anticipated power spike. This ensures that adequate power can be provided to the on-board electrical systems at all times, including during elevated load spikes. One device, which is used to manage the elevated load spikes is an electrical accumulator unit. The electrical accumulator unit can act either as a power source or as a power sink, and thereby allows for a smaller generator to be used.

SUMMARY

Disclosed is a method for controlling a power converter. The method includes the steps of determining an operating mode, determining a desired average converter current, determining an actual average converter current over a time period equal to one switching cycle of the power converter, comparing the desired average converter current with the actual average converter current, and outputting a control signal capable of adjusting a converter current based on said comparison.

Also disclosed is an electrical accumulator unit that has a power filter with electrical connections for connecting to a power bus, a power converter connected to the power filter, a power storage component connected to the power converter, and a controller. The controller is capable of controlling the power filter, the power converter, and the power storage component based on a desired average current and an actual average current.

These and other features of the present invention can be best understood from the following specification and drawings, the following of which is a brief description.

DETAILED DESCRIPTION

Figure 1:
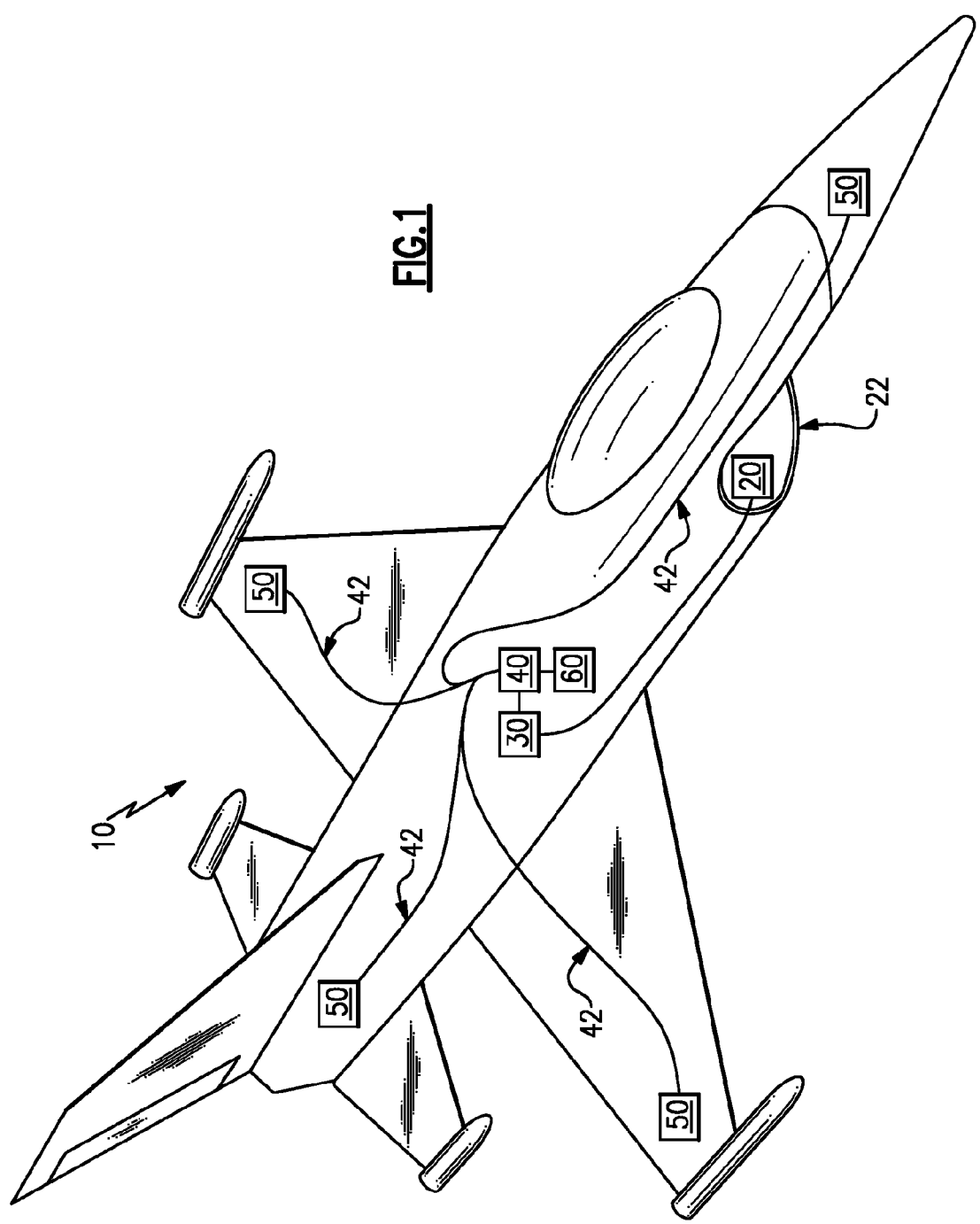
FIG. 1 illustrates a sample aircraft having an on-board power generation system.

FIG. 1 schematically illustrates a sample aircraft 10 having an on-board power generation system. A generator 20 converts rotational motion within an engine 22 into electrical power using known power generation techniques. The generator 20 is electrically coupled to a rectifier 30. The rectifier 30 converts the power generated in the generator 20 (typically three-phase power) into a form usable by on-board electronics 50 (typically DC power). The rectifier 30 is electrically coupled to a power bus 40 that supplies power to the on-board electronics 50 or the like through power supply lines 42. Additionally connected to the power bus 40, is an electrical accumulator unit 60, which can store excess power generated by the generator 20 if the load needed by the on-board electrical system 50 is low, and reinsert that power into the power system when the load needed by the on-board electrical system 50 undergoes a high load spike.

Figure 2:
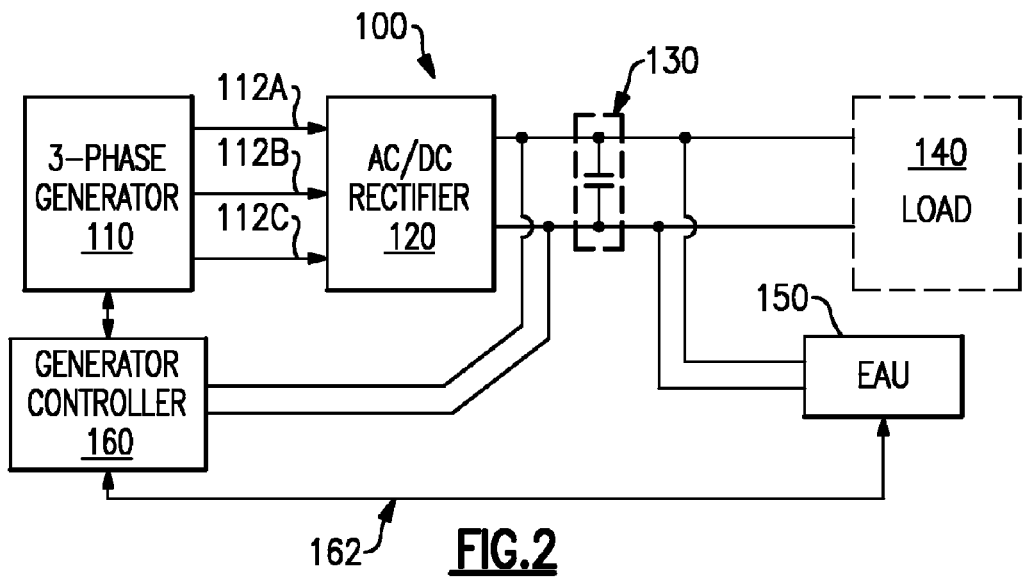
FIG. 2 schematically illustrates an aircraft power generation system including an electrical accumulator unit.

FIG. 2 schematically illustrates a power generation system 100 described with regards to FIG. 1. A three phase generator 110 is connected to an AC/DC rectifier 120 via three phase outputs 112A, 112B, 112C. The three phase generator 110 may also be referred to as generator 110. The AC/DC rectifier 120 converts the generated three phase power into DC power, and outputs the DC power to a power bus 130. Connected to the DC power bus 130 is a variable load 140. The variable load 140 (also referred to as an external load) may represent a variable number and size of electrical loads that can change over time and/or be selectively added, removed, or modified. Additionally connected to the DC power bus 130 is an electrical accumulator unit 150 (EAU). The three phase generator 110, AC/DC rectifier 120, DC power bus 130, variable load 140, and electrical accumulator unit 150 represent embodiments of the generator 20, rectifier 30, power bus 40, the load created by the on-board electronics 50, and electrical accumulator unit 60 of FIG. 1 respectively. A generator controller 160 (also referred to as controller 160) is connected to both the electrical accumulator unit 150 and the three phase generator 110, and provides control signals for both. The generator controller 160 is also connected to the output of the AC/DC rectifier 120 via power sensors, and is capable of detecting the power output of the AC/DC rectifier 120 and the power demands of the variable load 140. Alternately, the electrical accumulator unit 150 can be controlled by an independent controller.

The example power generation system 100 of FIG. 2 generates power at its maximum rating and the variable load 140 uses less than all of the generated power under normal conditions. The excess power is absorbed by the electrical accumulator unit 150, which stores the excess power in a power storage component such as a battery or ultra capacitor or a combination of both. When the variable load 140 spikes, and exceeds the generating capacity of the generator 110 the electrical accumulator unit 150 reverses and begins supplementing the power provided to the DC power bus 130 with the power which has been stored within the power storage component, thereby ensuring that the variable load 140 receives adequate power throughout the high power spike. When absorbing power, the electrical accumulator unit 150 is referred to as operating in a buck mode, and when supplementing/delivering power, the electrical accumulator unit 150 is referred to as operating in a boost mode.

Figure 3A:
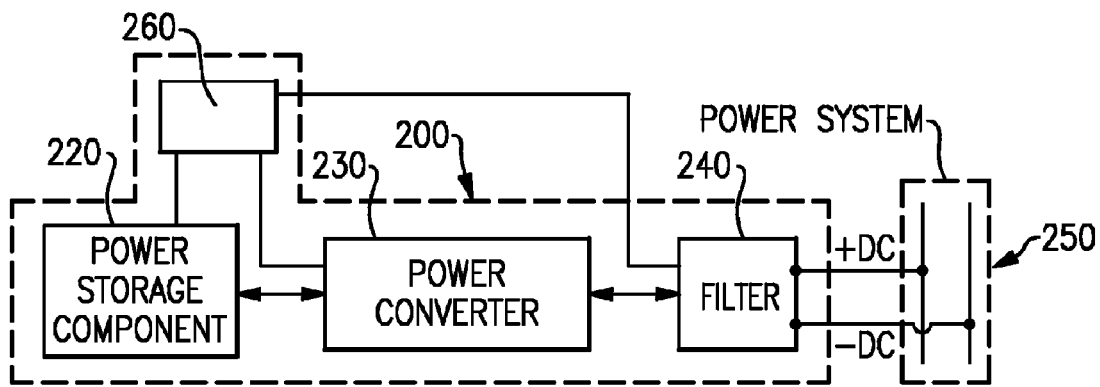
FIG. 3A schematically illustrates an electrical accumulator unit.

FIG. 3A illustrates a schematic diagram of an example electrical accumulator unit 200. The electrical accumulator unit 200 and power bus 250 represent embodiments of the electrical accumulator unit 150 and DC power bus 130 of FIG. 2. The electrical accumulator unit 200 has three primary components, an energy storage unit 220, a power converter 230, and a filter 240. Additionally included in the example of FIG. 3A is an electrical accumulator unit controller 260. Use of a separate controller 260 to control the electrical accumulator unit 200 can allow for localized control circuits. Alternatively, the electrical accumulator unit 200 could be controlled by controls housed within the generator controller 160, as in the example of FIG. 2. The filter 240 is a combination of a ripple filter and an electromagnetic interference (EMI) filter. The ripple filter portion of the filter 240 removes ripple currents that have leaked onto the power bus 250 due to the presence of power electronics in the load such as variable load 140 of FIG. 2, or due to the action of the power converter 230. Similarly, the EMI filter portion of the filter 240 filters out electromagnetic interference present on the power bus 250. Ripple currents and electromagnetic interference are common occurrences in such electrical systems and result from the connection of the power bus 250 has to the variable load as well as the electrical systems exposure to other sources of electrical noise. Allowing the interference and ripple currents to reach the power converter 230 is undesirable.

After passing through the filter 240, the electrical power enters a bi-directional power converter 230 where it is converted from the form of dc electrical power used by the power bus 250 into a form which can be accepted and stored by the energy storage component 220. The bi-directional power converter 230 is also capable of converting power output from the energy storage component 220 into the form used on the power bus 250 if the electrical accumulator unit 200 is providing power to the system, such as during a high load spike or while operating in emergency mode. Furthermore, by controlling the current passing through the converter 230, a controller can control the rate at which the energy storage component 220 is charged and discharged, and thereby control the electrical accumulator unit 200 functions. A method for controlling the current passing through the converter 230 is described below.

The energy storage component 220 can be any device or component that is capable of accepting power from the power converter 230 and storing that dc power for later use. In the illustrated example of FIG. 3A, a battery or ultra capacitor (ultra cap) or a combination of both could be used. However, other energy storage components could be used with minor modifications to the electrical accumulator unit 200.

Figure 3B:
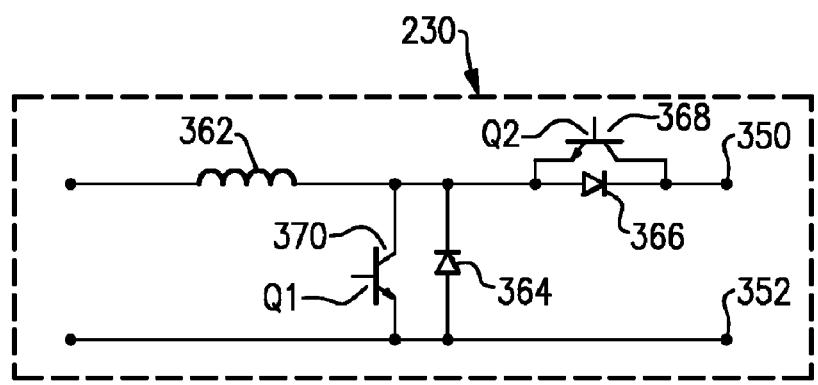
FIG. 3B schematically illustrates a buck-boost power converter circuit which could be used in the example of FIG. 3A.

FIG. 3B illustrates a more detailed example embodiment of a power converter 230, such as would be used in FIG. 3A. The power converter 230 has a high side power connector 350 and a low side power connector 352, which connect the power converter 230 to the filter 240 (illustrated in FIG. 3A). The example circuit illustrated in FIG. 3B is a bi-directional buck-boost converter that uses an inductor filter 362, a boost switch that has a transistor 370 and a diode 364, and a buck switch that has a transistor 368 and a diode 366 to reduce the voltage from the power bus 250 to a level acceptable by the energy storage component 220 while power is being stored, and to raise the voltage level of the power being produced by the energy storage component 220 when the energy storage component 220 is providing power to the power bus 250. It is additionally possible to include standard sensors (not pictured) capable of detecting the current passing through the inductor 362, the buck switch transistor 368, or the boost switch transistor 370.

While the example buck-boost converter uses a single buck-boost circuit, a functionally similar circuit could be used which includes several iterations of the illustrated buck-boost circuit connected in parallel and phase shifted to work as a single unit. The inductor filter 362, diodes 364, 366 and transistors 368, 370 need not be implemented as discrete components. The transistors 368, 370 in the buck-boost circuit can be controlled by the generator controller 160 (illustrated in FIG. 2) according to known control techniques, by a central power system controller which can control other load and storage units in modern aircraft electrical power systems, or by an independent electrical accumulator unit controller.

In order to control the power supplying/siphoning functions of the electrical accumulator unit 200 during normal operations, the controller 260 can place the electrical accumulator unit 200 in a boost mode (supplying power to the DC power bus), a buck mode (receiving power from the DC power bus), or a stand-by mode where the electrical accumulator unit 200 performs neither function. The electrical accumulator unit 200 defaults to operating in the stand-by mode. For example, if it is desirable to siphon power from a power bus, the controller 260 can generate a control signal which switches the electrical accumulator unit 200 from the stand-by mode to the buck mode.

The controller 260 also includes an average current sub-controller component for controlling the current flowing through the converter 230 in the electrical accumulator unit 200. This sub-controller component allows the controller 260 to control the converter 230 current based on a measured average current through the converter 230, as will be discussed below.

Figure 4:
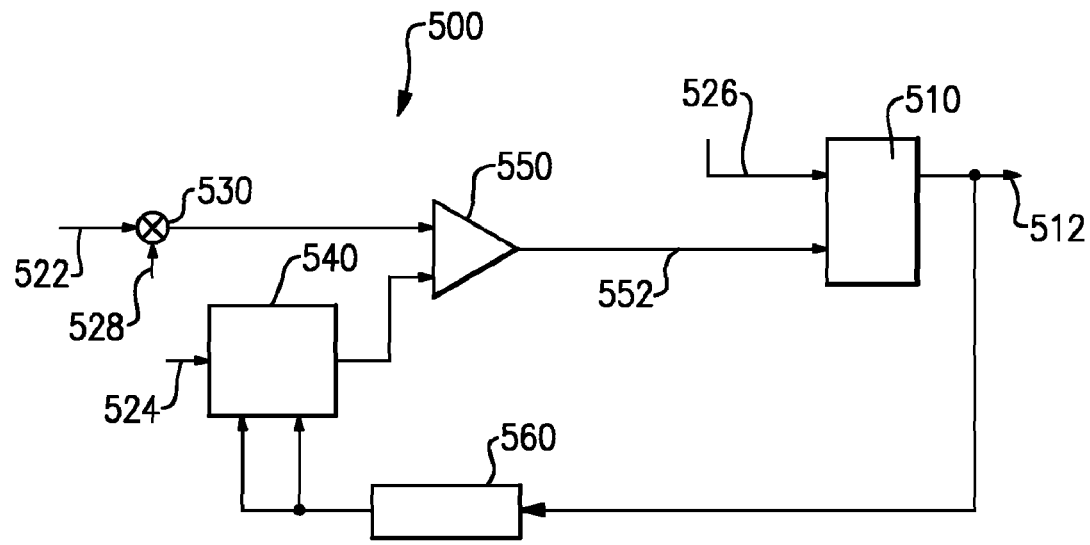
FIG. 4 illustrates an example control loop for controlling a buck-boost converter operating in a boost mode.

FIG. 4 schematically illustrates a feedback control circuit 500 (also referred to as a boost mode control loop 500) of the controller 260 for controlling the converter 230 in a boost mode. The system illustrated in FIG. 4 includes three control system inputs, a desired average current input 522, a measured inductor current input 524, and a boost-mode PWM clock signal input 526 into a flip-flop logic circuitry 510. A clock signal input is a pulse signal that occurs at a set frequency and can be generated by a standard controller using known techniques. The frequency of the clock signal input 526 is set by the controller 260, and is the switching frequency of the converter 230. The clock signal input 526 starts a Pulse Width Modulation (PWM) cycle of the power converter 230 in the boost-mode. The PWM frequency of the power converter 230 can range from kilohertz to megahertz depending on the capability of the power switching converter 230, and is decided by the designers during the design of the power system. The cyclic operation of the power converter 230 in boost mode begins when the first clock signal input 526 is received by the flip-flop logic circuitry 510.

The desired average current input 522 receives a command signal representing a desired average inductor current from the controller 260, which allows the converter 230 to optimally boost the power to the DC power bus 250. This desired current is determined by the controller 260 using known techniques. The desired current signal 522 is subtracted by a slope compensation signal 528, generated by the controller 260, in a subtraction block 530. The slope compensation signal 528 is a downward sloping signal that is periodic and shares a period with the clock signal input 526, and the PWM switching frequency. The inductor current input 524 receives a sensor output corresponding to the inductor current of the inductor 362 in the converter 230. The inductor 362 current can be measured using any known technique. The slope compensation signal 528 is determined by the power converter designer during the design of the system and is configured to stabilize the power converter 230, while it is operated in boost-mode. By way of example, the slope compensation signal 528 could be a signal that starts at a high value, and decreases to a low value at a consistent pace over the course of a single iteration of the power converter's power cycle. Such a signal is referred to as a down ramp signal.

The boost mode control loop 500 integrates the received inductor current 524 using an integrator 540 that is reset at the beginning of each PWM cycle when a falling edge detector 560 outputs a reset signal. The falling edge detector 560 detects when the integration cycle is ending by detecting a falling edge of the control signal 512 (i.e. a flip-flop logic circuitry 510 output signal 512 changes from "1" to "0"). The final value of the output of the integrator before being reset is the average inductor current of the PWM cycle. The average current during the boost mode is determined using the formula:

$$I_{average} = \left(\frac{1}{T_s}\right)\int_0^{T_s} I_{Inductor}\,dt.$$

Ts is the period of the clock signal 526. The determined average value is sent from the output of the integrator 540 to an input of the comparator 550.

The comparator 550 compares the average inductor current value from the integrator 540 to the desired average inductor current value from the compensated command signal output from the subtraction block 530. When the inputs of the comparator 550 equal each other, the comparator 550 outputs a signal to reset the flip-flop logic circuitry 510 to "0", and to reset the integrator 540. While the output of the flip-flop logic circuitry 510 is "1", the boost switch 370 (of FIG. 3B) is turned-on, and while the flip-flop logic circuitry 510 is "0" the boost switch 370 is turned off, thereby controlling the converter. The control output 512 is also linked to a falling edge detector 560.

In theoretical control systems, level changes of the control signal are performed instantaneously. In practical systems, if a control signal switches from a high signal to a low signal there is a lag time during which the voltage rapidly declines, rather than an instantaneous decline. This rapid decline is referred to as a falling edge. Similarly, transitioning from a low signal to a high signal causes a rising edge in practical systems. When a falling edge is detected, the falling edge detector 560 emits a pulse, which resets the integrator 540 to a "0" value, and starts the next iteration of the boost mode control loop 500.

Thus, the boost mode control loop 500 causes the controller 260 to accurately adjust the converter 230 current based on a measured average converter current 524, and thereby allows for precision control of the converter current in a boost mode. In boost mode, the integrator 540 continuously integrates the incoming converter currents 524.

Figure 5:
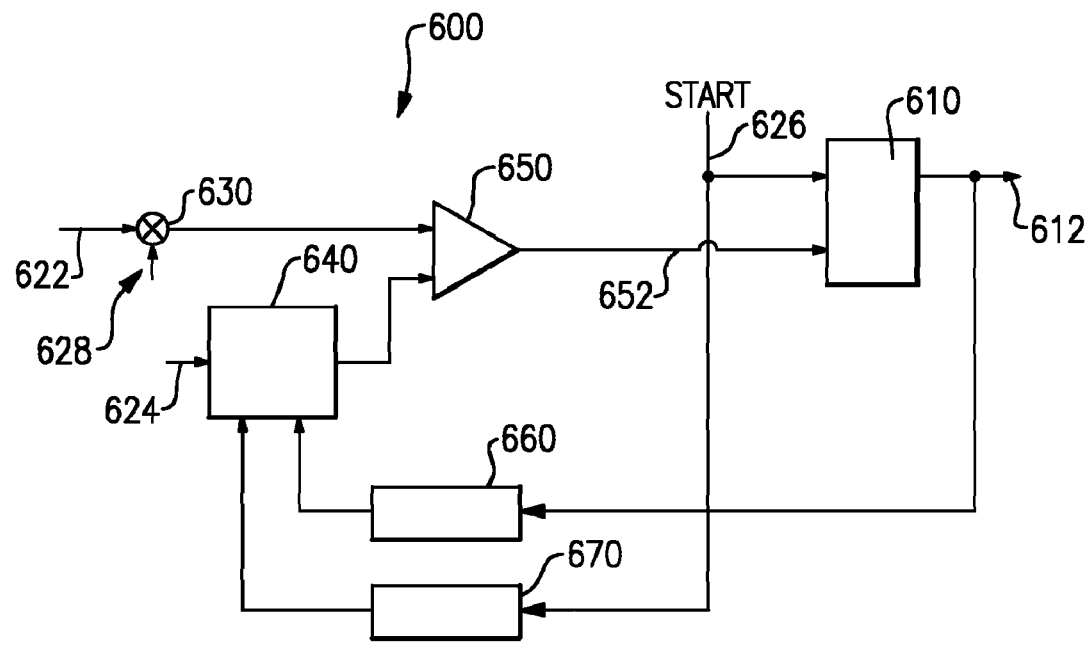
FIG. 5 illustrates an example control loop for controlling a buck-boost converter operating in a buck mode.

A similar feedback loop is illustrated in FIG. 5, which schematically depicts a feedback control loop 600 (also referred to as a buck mode control loop 600) for a converter 230 operating in buck mode. The buck mode control loop 600 is similar to the boost mode control loop 500, with like numerals indicating like elements. The buck mode control loop 600 operates similar to the boost mode control loop 500 illustrated in FIG. 4 and described above. The buck mode control loop 600 differs from the boost mode control loop 500 in three ways. In buck mode, the measured current 624 for the integrator 640 input is the current through a buck switch 368 rather than the current through the inductor 362 as in the boost mode.

The second difference between the two modes is the operation of the integrator 640. As described above with regard to FIG. 4, the integrator 540 continuously integrates and is reset to "0" each iteration of the boost mode control loop 500. Control signals for operating in a buck mode are non-continuous and therefore cannot be continuously integrated. A non-continuous signal includes breaks where no control signal is output. During those breaks, the integrator 640 would not function. Consequently, the integrator 640 is started and stopped for each iteration of the buck mode control loop 600 rather than run continuously as in the boost mode control loop 500. To facilitate starting and stopping the integrator 640 during each iteration, a rising edge detector 670 detects a rising edge of the control signal at the start of each iteration, and starts the integrator 640. When the iteration of the feedback loop ends, there is a falling edge on the control signal. When the falling edge detector 660 detects the falling edge, the integrator 640 is stopped, the average current is output to the comparator 650, and the integrator 640 is reset. The formula used to determine the average current in buck mode is $$I_{average} = \left(\frac{1}{T_s}\right)\int_0^{T_s} I_{buckswitch}\,dt.$$

The third difference is which converter switch 368, 370 is being controlled. In the buck mode the control loop 600 controls the buck switch 368. As with the boost mode, when the flip-flop logic circuitry 610 is "1," the buck switch 368 is on, and when the flip-flop logic circuitry 610 is "0," the buck switch 368 is off.

The controller 260 can be configured such that each of the buck control loop 500 and the boost control loop 600 use shared components, where the components are redundant, or configured with two independent control paths that are switched between based on a desired operating mode signal 526, 626.

While the above converter circuit controller has been described with relation to an electrical accumulator unit, it is understood that a control circuit according to the present disclosure could be utilized with a PWM converter control circuit, and is not limited to electrical accumulator unit applications. Although an example embodiment has been disclosed, a worker of ordinary skill in this art would recognize that certain modifications would come within the scope of this invention. For that reason, the following claims should be studied to determine the true scope and content of this invention.

What is claimed is:

1. A method for controlling a power converter comprising the steps of:
   determining an operating mode using a controller;
   controlling a power converter by performing the steps of:
   determining a desired average current based at least partially on said operating mode using the controller;
   determining an actual average current over a time period equal to one switching cycle of the power converter;
   comparing said desired average current flow with said actual average current; and
   outputting a control signal capable of adjusting a current based at least partially on said comparison.

2. The method of claim 1, wherein said step of determining an operating mode further comprises selecting an operating mode from a list comprising a boost mode, a stand-by mode, or a buck mode.

3. The method of claim 2, wherein said step of determining an actual average current comprises integrating a measured inductor current over a time period equal to one switching cycle of the power converter, and dividing the integrated inductor current by a value equal to a number of seconds in said time period, thereby determining an average current when said operating mode is a boost mode.

4. The method of claim 3, wherein the measured inductor current is an inductor filter current.

5. The method of claim 3, wherein said step of determining an actual average current further comprises the steps of detecting a falling edge of a control signal and resetting an integration value to a starting value when said falling edge is detected and said operating mode is a boost mode.

6. The method of claim 2, wherein said step of determining an actual average current further comprises the steps of integrating a measured transistor current over a time period equal to one switching cycle of the power converter and dividing the integrated transistor current by a value equal to a number of seconds in said time period, thereby determining an average current when said operating mode is a buck mode.

7. The method of claim 6, wherein said measured transistor current is a buck switch transistor current.

8. The method of claim 6, wherein said step of determining an actual average current when said operating mode is a buck mode further comprises the steps of:
   detecting a rising edge of a control signal;
   starting an integrator in response to said rising edge;
   detecting a falling edge of a control signal;
   stopping an integrator in response to said falling edge;
   integrating a measured current over a time period starting at said rising edge and ending at said falling edge;
   dividing said integrated measured current by a number of seconds in said time period, thereby determining an average converter current.

9. The method of claim 8, further comprising the steps of resetting an integrator to an original value when a falling edge is detected.

10. The method of claim 2, wherein said steps of determining a desired average current using the controller, determining an actual average current over a time period equal to one switching cycle of the power converter, comparing said desired average current with said actual average current, and outputting a control signal capable of adjusting a current based at least partially on said comparison are suspended while said operating mode is a stand-by mode.

11. The method of claim 1, wherein said step of determining a desired average current comprises the steps of:
   receiving a desired average current value at a summer from a controller;
   receiving a stabilizing signal at said summer from the controller;
   summing said desired average current value and said stabilizing signal using said summer; and
   outputting a stabilized desired average current value from said summer.

12. The method of claim 11, wherein said stabilizing signal comprises a down ramp signal.

13. An electrical accumulator unit comprising:
   a power filter having electrical connections for connecting to a power bus;
   a power converter connected to said filter;
   a power storage component connected to said power converter; and
   a controller capable of controlling said power filter, said power converter, and said power storage component based on a desired average current and an actual average current.

14. The electrical accumulator unit of claim 13, wherein said controller comprises a buck mode control loop circuit and a boost mode control loop circuit controllably connected to at least one of said power converter, said power filter, and said power storage component, each of said control loop circuits having inputs for receiving a desired average current value from a controller.

15. The electrical accumulator unit of claim 13, wherein said power converter further comprises a filter inductor, a boost switch, and a buck switch.

16. The electrical accumulator unit of claim 15, wherein said power converter further comprises a sensor capable of detecting a current passing through said filter inductor.

17. The electrical accumulator unit of claim 15, wherein said power converter further comprises a sensor capable of detecting a current passing through said buck switch.

18. A method for controlling an electrical accumulator unit current comprising the steps of:
   determining an operating mode using a controller;
   controlling an electrical accumulator unit power converter, and thereby controlling said electrical accumulator unit power accumulation functions by performing the steps of:
   determining a desired average converter current based at least partially on said operating mode using the controller;
   determining an actual average converter current over a time period equal to one iteration of the method;
   comparing said desired average converter current with said actual average converter current; and
   outputting a control signal capable of adjusting a converter current based at least partially on said comparison.

* * * * *